(12) United States Patent
Jorgensen (10) Patent No.: US 7,969,994 B2
(45) Date of Patent: Jun. 28, 2011

(54) METHOD AND APPARATUS FOR MULTIPLE CONNECTIONS TO GROUP OF SWITCHES

(75) Inventor: Steven Glen Jorgensen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 11/192,534

(22) Filed: Jul. 29, 2005

(65) Prior Publication Data
US 2007/0025362 A1   Feb. 1, 2007

(51) Int. Cl.
*H04L 12/56* (2006.01)

(52) U.S. Cl. ......... 370/401; 370/351; 370/352; 370/403

(58) Field of Classification Search ................ 370/400, 370/254, 248, 401, 351, 352, 403
See application file for complete search history.

(56) References Cited

U.S. PATENT DOCUMENTS

| | | | |
|---|---|---|---|
| 5,751,710 A | 5/1998 | Crowther et al. | |
| 6,285,674 B1 | 9/2001 | Soni et al. | |
| 6,493,318 B1 | 12/2002 | Bare | |
| 6,577,600 B1 | 6/2003 | Bare | |
| 6,580,715 B1 | 6/2003 | Bare | |
| 6,711,171 B1 * | 3/2004 | Dobbins et al. ............... | 370/400 |
| 6,771,617 B1 | 8/2004 | Fielding | |
| 6,917,759 B2 | 7/2005 | de Boer et al. | |
| 7,085,241 B1 | 8/2006 | O'Neill et al. | |
| 7,111,073 B1 | 9/2006 | Jain et al. | |
| 7,376,089 B2 * | 5/2008 | Wakumoto et al. ........... | 370/254 |
| 2003/0117945 A1 | 6/2003 | Zboril | |
| 2003/0174723 A1 | 9/2003 | DeHon et al. | |
| 2004/0190454 A1 | 9/2004 | Higasiyama | |
| 2005/0192037 A1 | 9/2005 | Nanda et al. | |
| 2005/0213513 A1 | 9/2005 | Ngo et al. | |
| 2006/0285498 A1 * | 12/2006 | Wakumoto et al. ........... | 370/248 |

OTHER PUBLICATIONS

"Achieving High Performance through Load-Balancing, VLANs, and Broadcast/Multicast Control", HP Proactive Networking, White Paper, Aug. 1998, Hewlett Packard.

HP Proactive Networking; "Achieving High Performance Through Load-Balancing VLANS and Broadcast/Multicast Control"; White Paper; Aug. 1998; pp. 1-14.

* cited by examiner

*Primary Examiner* — Man Phan
*Assistant Examiner* — Nourali Mansoury (57) ABSTRACT

One embodiment relates to a method of a single network device outside of a group of switches connecting via multiple connections to the group of switches. Multiple ports of the single network device are connected with ports of at least one switch within the group, and the connected ports on the at least one switch are mapped to different virtual local area networks configured in the group of switches. A path from each of the connected ports on the at least one switch are replicated through the group of switches. Other embodiments are also disclosed.

17 Claims, 8 Drawing Sheets

FIG. 1
(Conventional)

METHOD AND APPARATUS FOR MULTIPLE CONNECTIONS TO GROUP OF SWITCHES

BACKGROUND OF THE INVENTION

1. Field of the Invention

The present invention relates generally to communication networks.

2. Description of the Background Art

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

DETAILED DESCRIPTION

Switching Mesh

Figure 1:
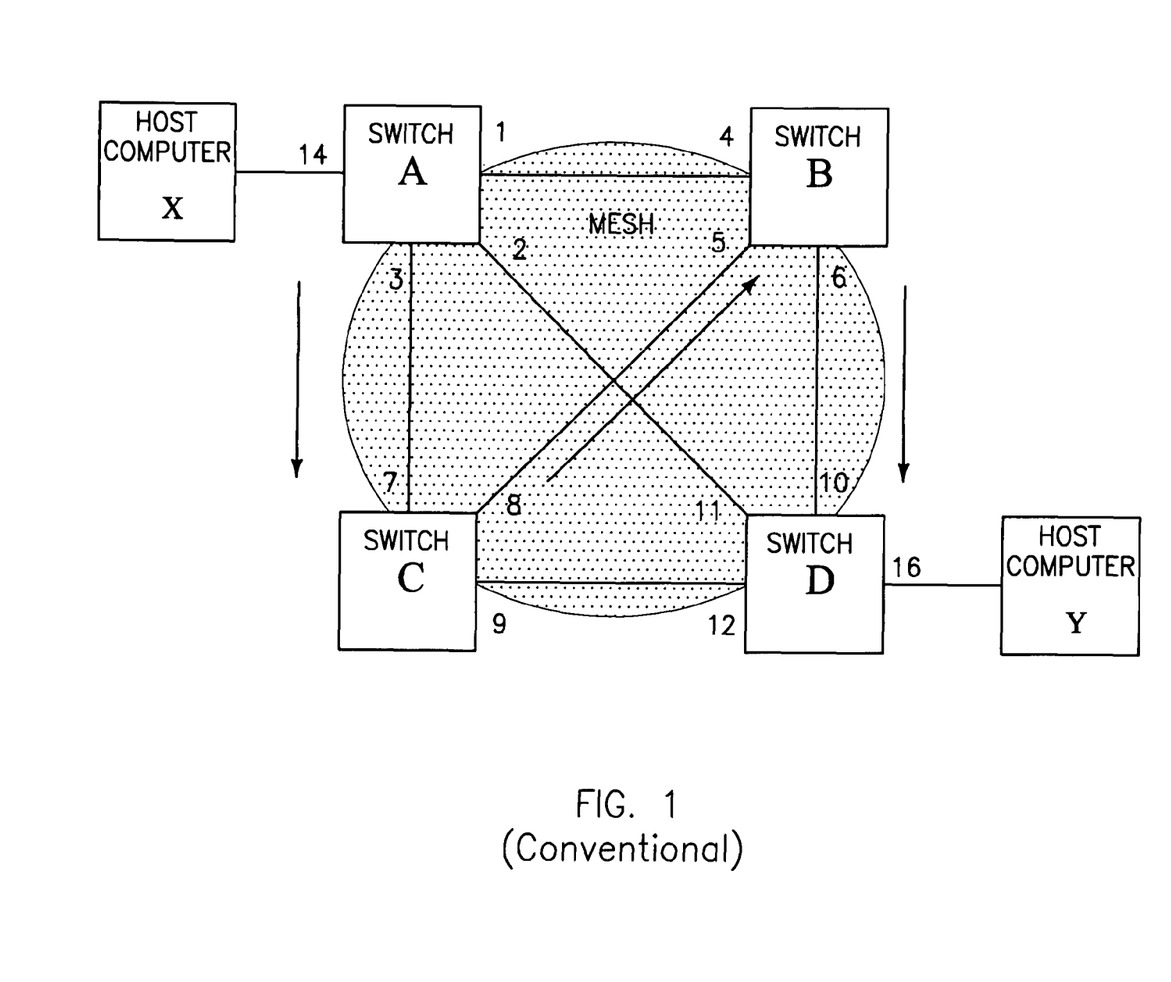
FIG. 1 is a schematic diagram depicting a conventional switching mesh.

FIG. 1 is a schematic diagram depicting a conventional switching mesh. In the example of FIG. 1, the overall switching mesh comprises four interconnected mesh switches (A, B, C, and D). Port 1 of switch A connects to port 4 of switch B. Port 2 of switch A connects to port 11 of switch D. Port 3 of switch A is connected to port 7 of switch C. Port 5 of switch B is connected to port 8 of switch C. And so on.

In addition, host computers are depicted as coupled to the mesh. Host computer X is coupled to the mesh by way of port 14 of switch A. Host computer Y is coupled to the mesh by way of port 16 of switch D. Of course, these two host computers are shown for purposes of discussion, and many more host computers may communicate with each other by way of the switching mesh.

As shown in the example of FIG. 1, host X is sending traffic to host Y. The path transversed by the traffic is as follows: enters port 14 of switch A; exits port 3 of switch A; enters port 7 of switch C; exits port 8 of switch C; enters port 5 of switch B; exits port 6 of switch B; enters port 10 of switch D; and exits port 16 2 of switch D.

Conventional Connection from Network Device to Switching Mesh

Currently, a network device or end node with multiple ports may only connect to a single switch of a switching mesh. This connection is configured from one port of the end node to a single switch. In FIG. 1, for example, host X connects to mesh switch A via a connection from a single port on host X to port 14 of switch A. Similarly, host Y connects to mesh switch D via a connection from a single port on host Y to port 16 of switch D.

The connection between end node and mesh switch is made using software currently on end nodes that implements a method called trunking. However, using the trunking method creates a single point of failure in the mesh switch directly connected to by the device.

Multiple Connections from Network Device to Switching Mesh

Conventionally, a network device which is not a mesh switch may connect to only a single switch in a switching mesh by way of a non-mesh port. In contrast, the technique disclosed herein enables a network device which is not a mesh switch to connect to multiple switches in a switching mesh by way of multiple non-mesh ports.

Figure 2:
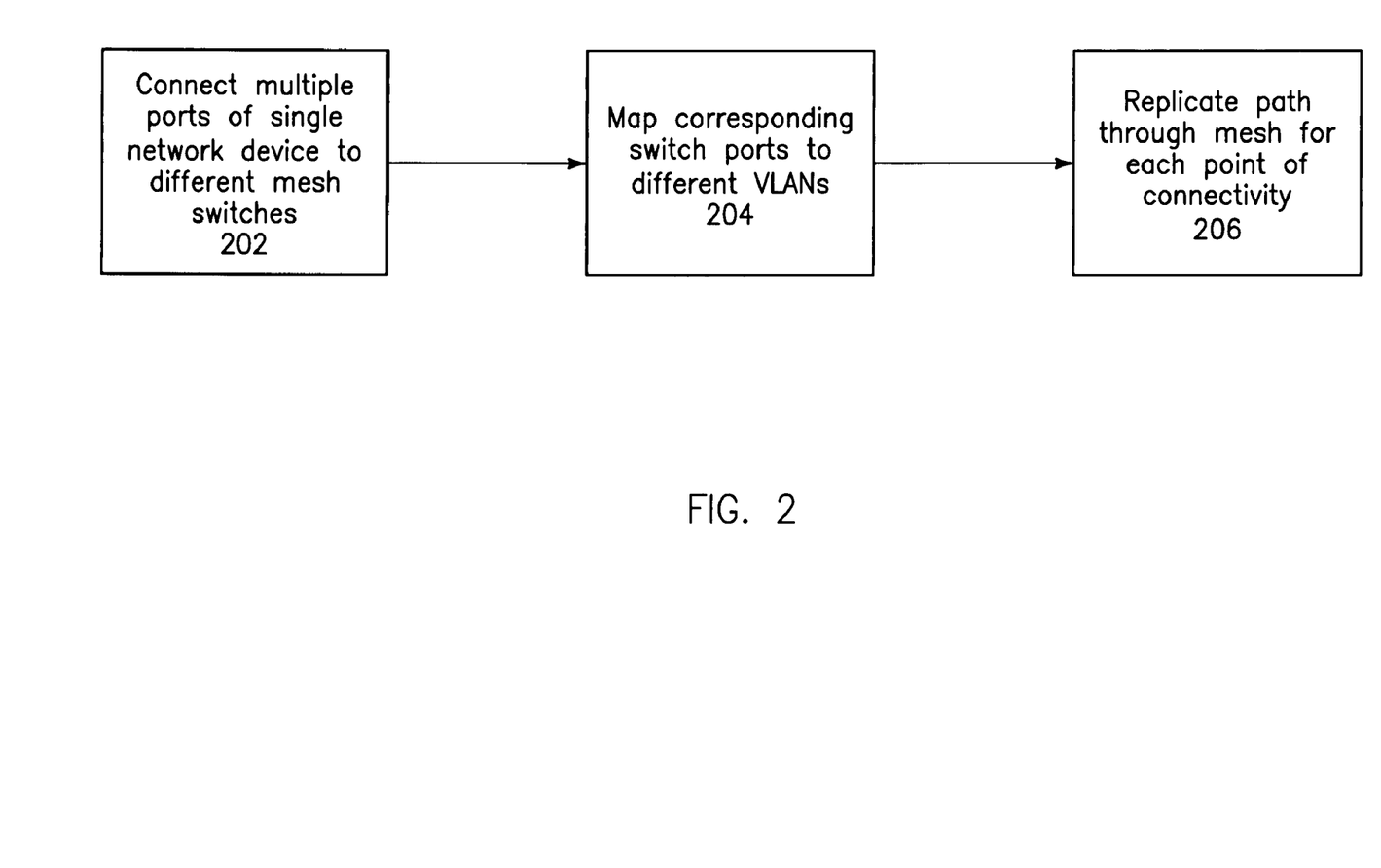
FIG. 2 is a flow chart depicting a method of connecting to different switches in a switching mesh in accordance with an embodiment of the invention.
Figure 3A:
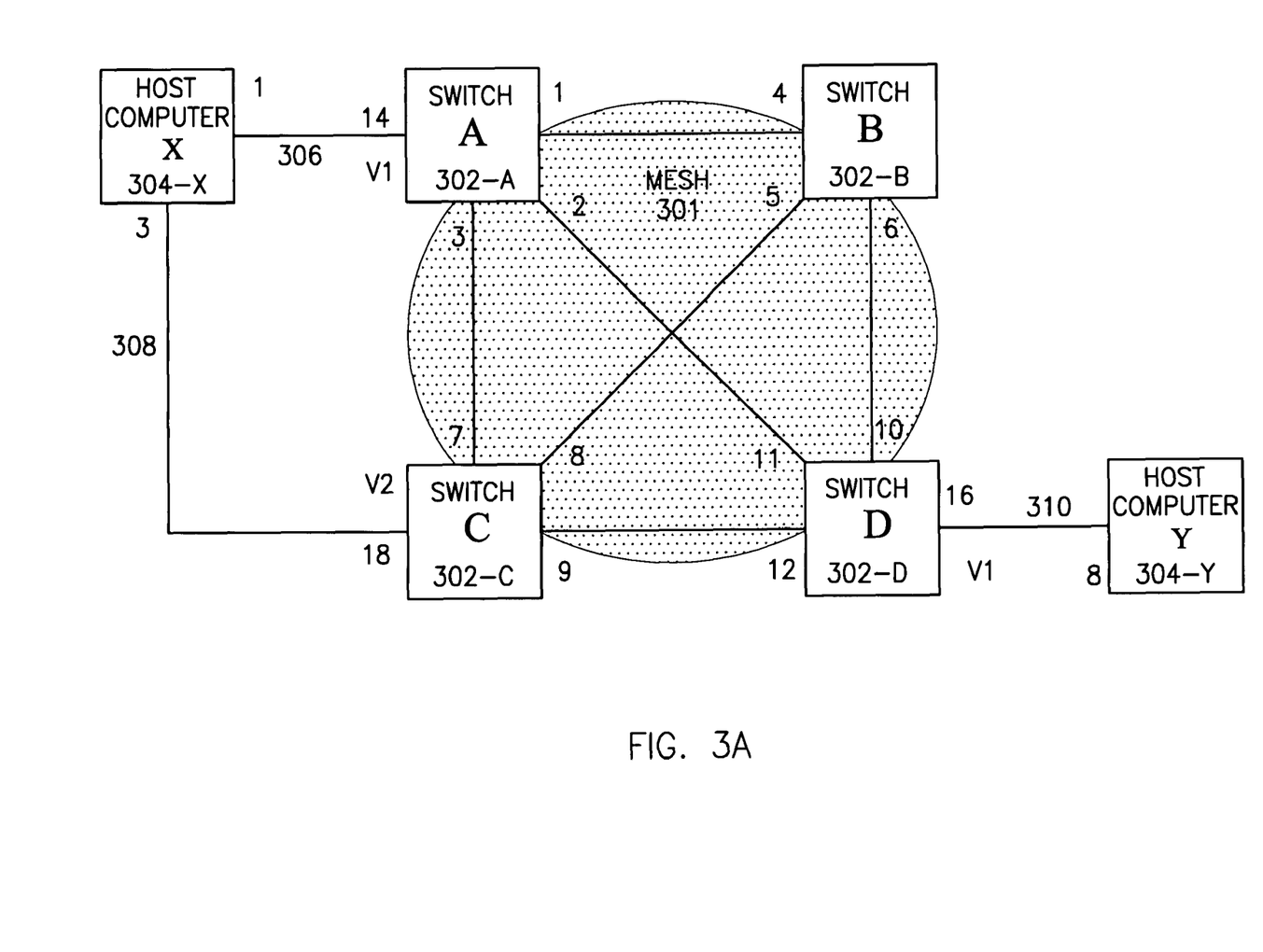
FIG. 3A is a schematic diagram of an example switching mesh with multiple connections from a network device to different switches in accordance with an embodiment of the invention.
Figure 3B:
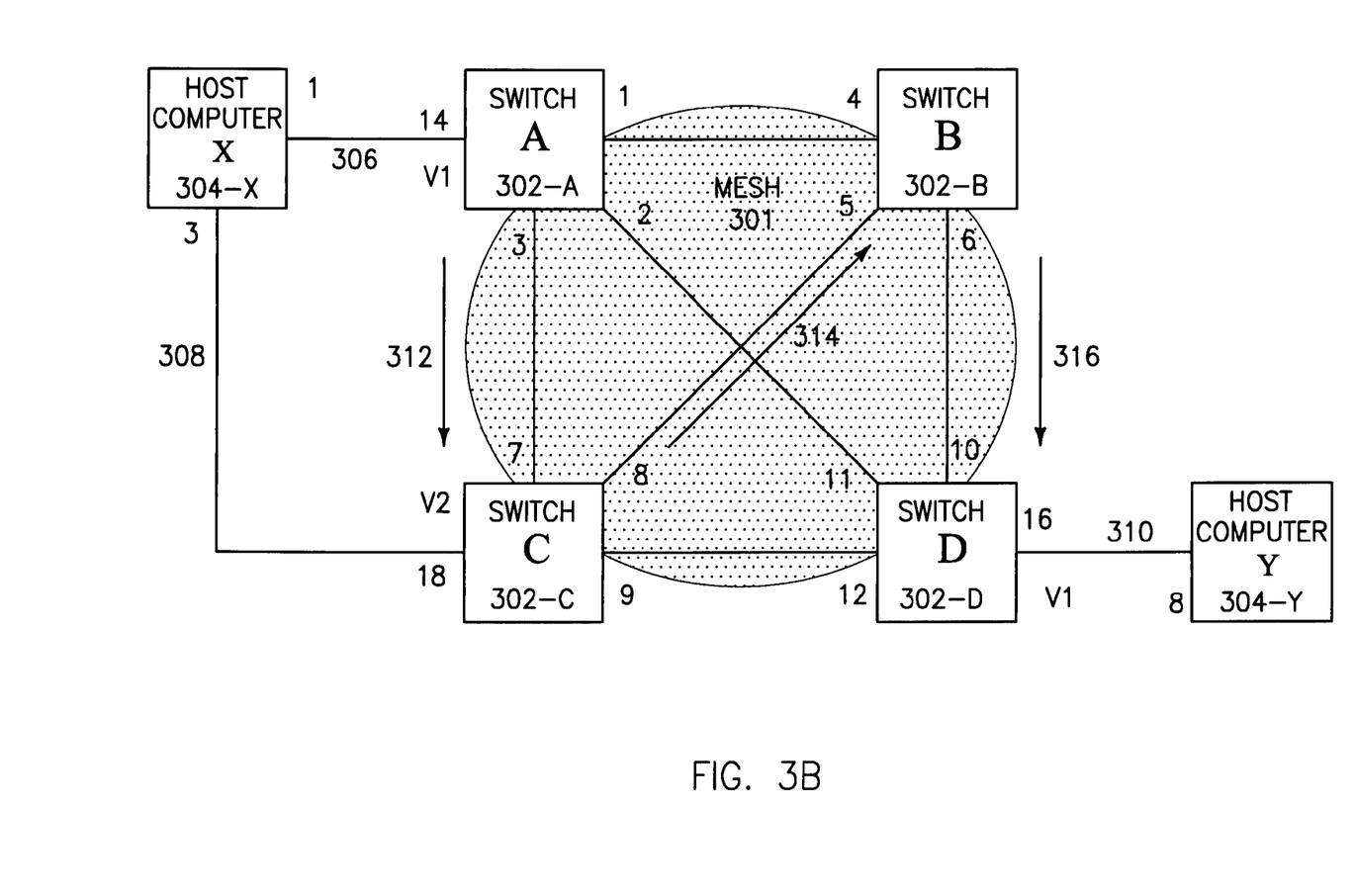
FIG. 3B illustrates path replication for a first connectivity point in accordance with an embodiment of the invention.
Figure 3C:
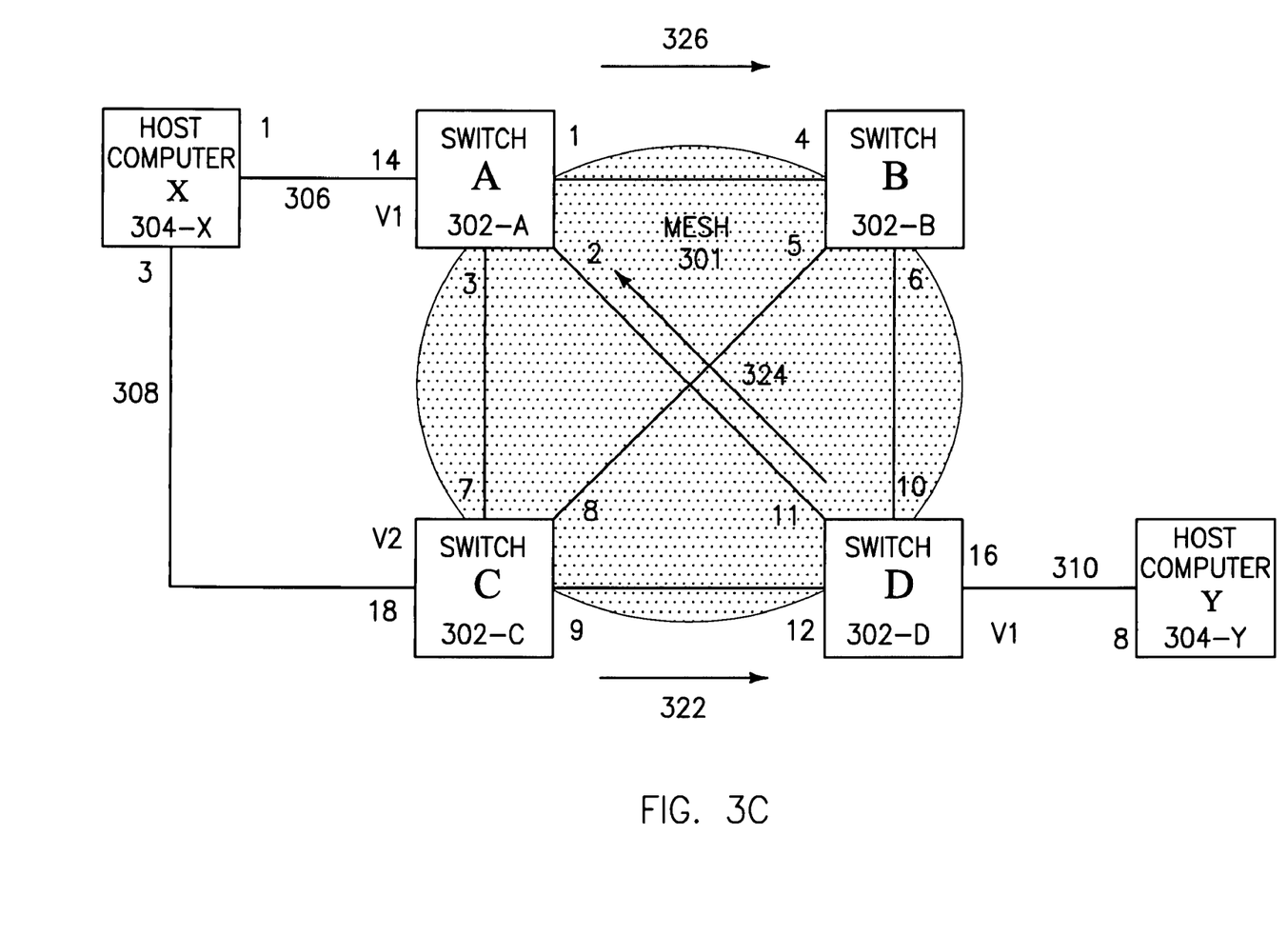
FIG. 3C illustrates path replication for a second connectivity point in accordance with an embodiment of the invention.
Figure 4:
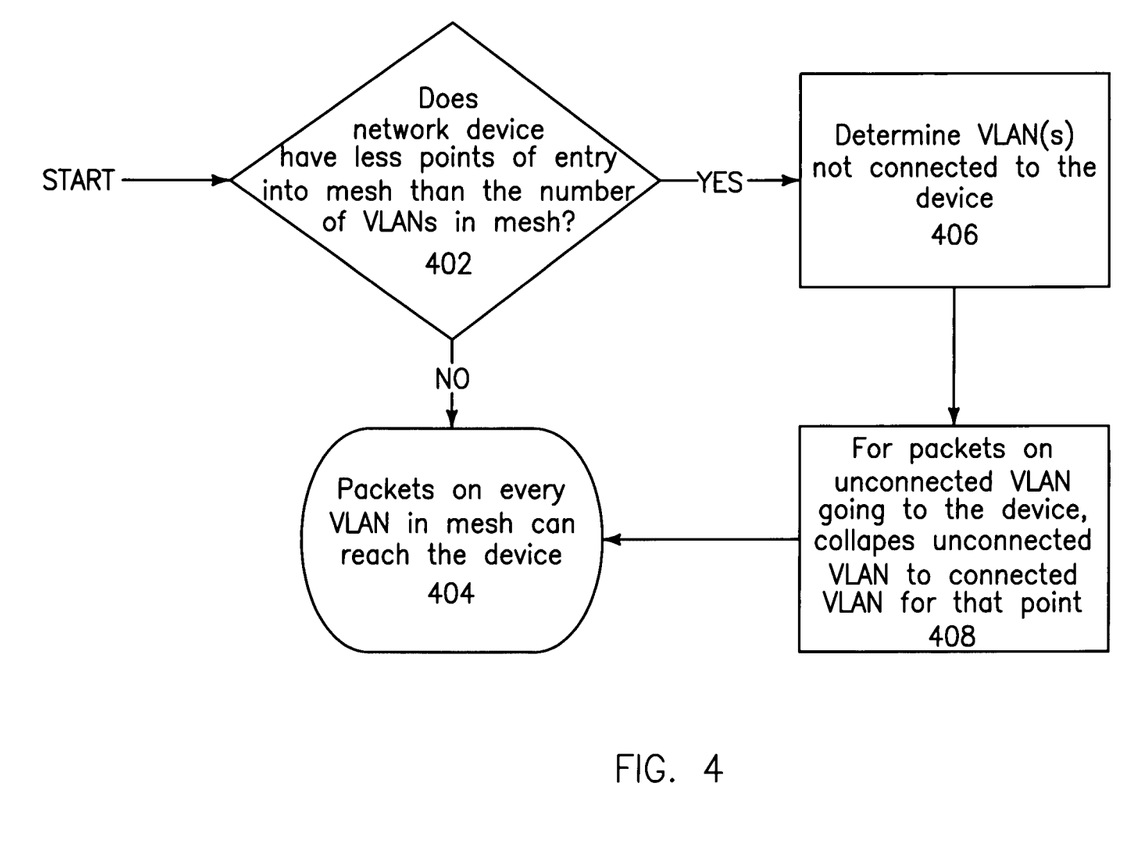
FIG. 4 is a flow chart depicting a method of dealing with a device with a single entry point into the switching mesh in accordance with an embodiment of the invention.

FIGS. 2, 3A, 3B, 3C and 4 are discussed below so as to explain an example embodiment of the invention. FIG. 2 is a flow chart depicting a method of connecting a network device or end node to different switches in a switching mesh in accordance with an embodiment of the invention. FIG. 3A is a schematic diagram of an example switching mesh with multiple connections from a network device to different switches in accordance with an embodiment of the invention. FIG. 3B illustrates path replication for a first connectivity point in accordance with an embodiment of the invention. FIG. 3C illustrates path replication for a second connectivity point in accordance with an embodiment of the invention. FIG. 4 is a flow chart depicting a method of dealing with a device with a single entry point into the switching mesh in accordance with an embodiment of the invention.

Referring to FIG. 2, connections are made 202 between multiple ports of the network device and non-mesh ports of different mesh switches. Each said connection being between a port of the device and a corresponding non-mesh port of a mesh switch. For example, in FIG. 3A, a first connection 306 is made between port 1 of the network device or end node X 304-X and non-mesh port 14 of mesh switch A 302-A, and a second connection 308 is made between port 3 of the same network device or end node X 304-X and non-mesh port 18 of mesh switch C 302-C.

Other network devices may have just a single connection between a port of the device and a non-mesh port of a mesh switch. For example, in FIG. 3A, device Y 304-Y has a single point of entry into the switching mesh 301 via a connection between port 8 of device Y 304-Y and non-mesh port 16 of mesh switch D 302-D.

Referring again to FIG. 2, the corresponding non-mesh switch ports are mapped 204 to different virtual local area networks (VLANs) configured in the switching mesh. For example, in FIG. 3A, the non-mesh port 14 of mesh switch A 302-A is mapped onto a primary virtual local area network (VLAN) V1 configured in the switching mesh 301, and the non-mesh port 18 of mesh switch C 302-C is mapped onto a secondary VLAN V2 configured in the switching mesh 301.

For a network device with a single point of entry into the switching mesh, the corresponding non-mesh switch port is mapped onto one of the configured VLANs. For example, in FIG. 3A, non-mesh port 16 of mesh switch D 302-D is the single point of entry for device Y 304-Y and is mapped onto the primary VLAN V1.

Referring again to FIG. 2, a path through the mesh is replicated 206 for each point of connectivity into the switching mesh. For example, in FIG. 3A, device X 304-X has two points of connectivity into the switching mesh 301. A first point of connectivity is via non-mesh port 14 of mesh switch A 302-A, and a second point of connectivity is via non-mesh port 18 of mesh switch C 302-C.

Path replication through the mesh 301 for the first point of connectivity is depicted in FIG. 3B. As shown in the example illustrated in FIG. 3B, the replicated path may travel over a first link 312 from mesh port 3 of switch A 302-A to mesh port 7 of switch C 302-C, then over a second link 314 from mesh port 8 of switch C 302-C to mesh port 5 of switch B 302-B, and finally over a third link 316 from mesh port 6 of switch B 302-B to mesh port 10 of switch D 302-D.

Path replication through the mesh 301 for the second point of connectivity is depicted in FIG. 3C. As shown in the example illustrated in FIG. 3C, the replicated path may travel over a first link 322 from mesh port 9 of switch C 302-C to mesh port 12 of switch D 302-D, then over a second link 324 from mesh port 11 of switch D 302-D to mesh port 2 of switch A 302-A, and finally over a third link 326 from mesh port 1 of switch A 302-A to mesh port 4 of switch B 302-B.

FIG. 4 is a flow chart depicting a method of dealing with a device with a single entry point into the switching mesh in accordance with an embodiment of the invention. More generally, the method in FIG. 4 deals with a device having less points of entry into the mesh than the number of VLANs configured in the mesh.

A determination 402 may be made as to whether a device has less points of entry into the mesh than the number of VLANs configured in the mesh. For example, if there are two VLANs configured in a switching mesh as shown in FIG. 3A, then the determination 402 becomes as to whether a device has only a single entry point into the switching mesh 301. In FIG. 3A, network device Y 304-Y is such a device with only a single entry point (connection 310) into the mesh 301, while network device X 304-X is not such a device as it has two entry points (connections 306 and 308) into the mesh 301.

If the device does not have less points of entry into the mesh than the number of VLANs configured in the mesh, then that device can be reached 404 by packets on every VLAN configured in the mesh. This is because each point of entry from that device into the mesh is assigned to a different VLAN configured in the mesh.

On the other hand, if the device does have less points of entry into the mesh than the number of VLANs configured in the mesh, then the VLANs not connected to the device are determined 406, and, for packets on those unconnected VLANs going to the device, the unconnected VLANs are collapsed 408 onto the connected VLAN at that point. In the example of FIG. 3A, device Y 304-Y is connected to the primary VLAN V1 via port 16 of switch D 302-D, but device Y 304-Y is not connected to the secondary VLAN V2. Hence, for packets going to device Y 304-Y on unconnected VLAN V2, VLAN V2 will be collapsed onto connected VLAN V1 at port 16 of switch D 302-D. In other words, switch D 302-D will send packets received on VLAN V2 which are destined for device Y 304-Y out of port 16 of switch D 302-D. In this way, for the purpose of packets going to device Y 304-Y, VLAN V2 is effectively "collapsed" onto VLAN V1 at switch D 302-D.

Figure 5:
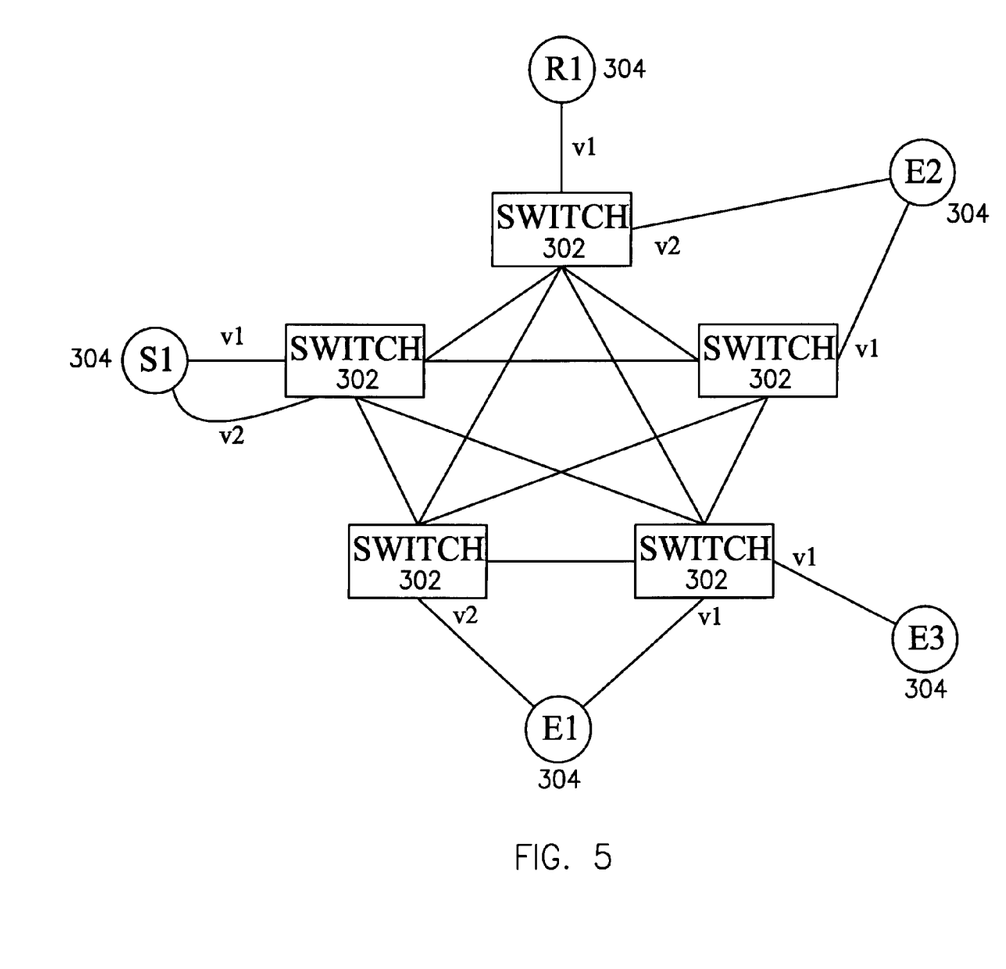
FIG. 5 is a schematic diagram of another example switching mesh with multiple connections from a network device in accordance with an embodiment of the invention.

FIG. 5 is a schematic diagram of another example switching mesh with multiple connections from a network device in accordance with an embodiment of the invention. Here, the example mesh includes five switches 302. Various hosts or routers or other network devices 304 are shown connected to the switching mesh. Some of the network devices 304 (S1, R1 and E3) have one or more connections to a single mesh switch 302 via one or more non-mesh ports. In particular, device S1 has two connections to a mesh switch 302, where one connection is to a non-mesh port configured for a first VLAN V1 and another connection is to another non-mesh port configured for a second VLAN V2. Devices R1 and E3 both have a single connection to a mesh switch 302, where each connection is to a non-mesh port configured for the first VLAN V1. Other network devices 304 (in particular, E1 and E2) are connected to two mesh switches 302 via a first non-mesh port on a first switch 302 configured for the first VLAN V1 and a second non-mesh port on a second switch 302 configured for the second VLAN V2. V1 may be the primary VLAN, and V2 may be the secondary VLAN.

Figure 6:
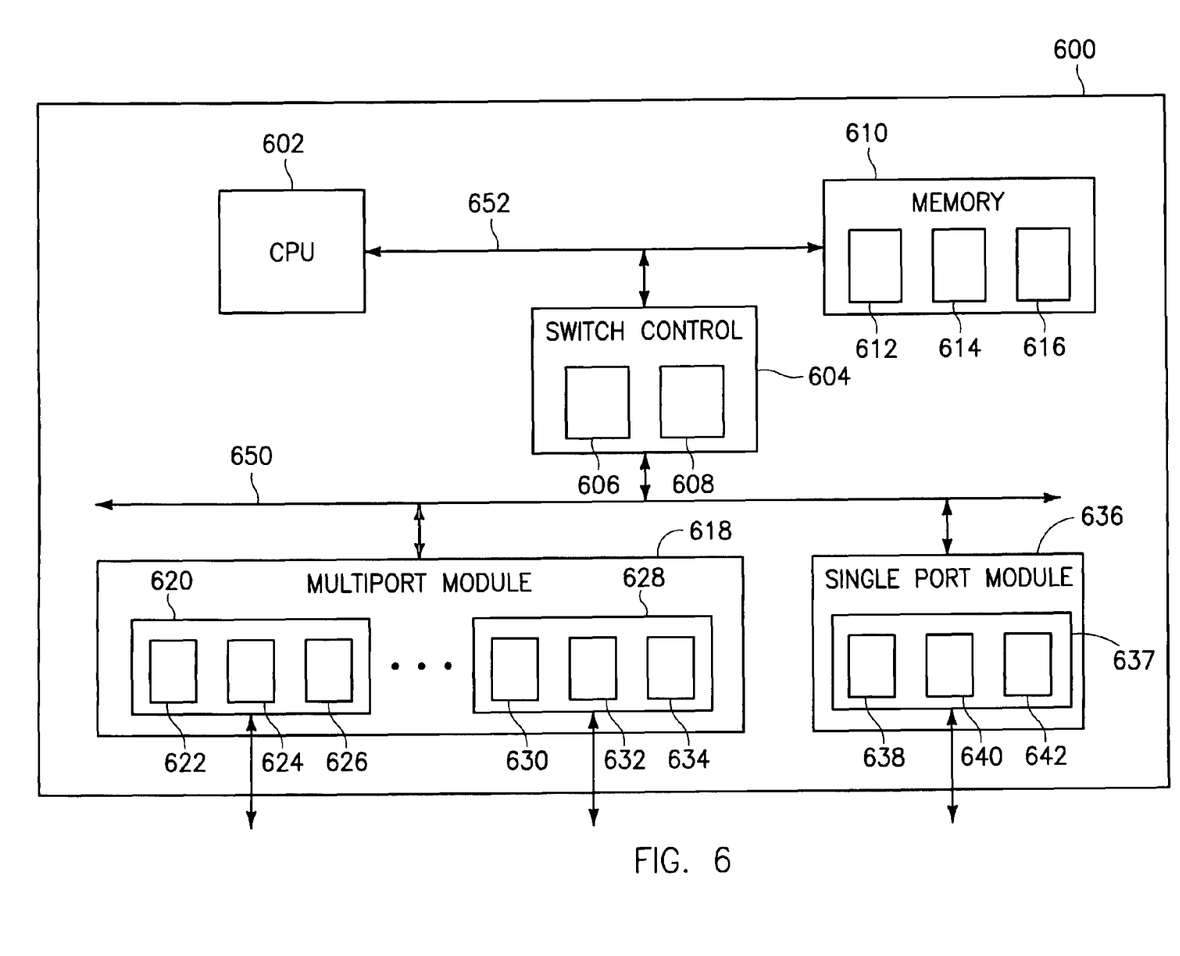
FIG. 6 is a schematic diagram of an example packet switch operable in accordance with one embodiment of the invention.

FIG. 6 is a schematic diagram of an example packet switch 600 operable in accordance with one embodiment of the invention. The switch 600 may be configured to be part of a switching mesh as described above. Of course, other types of switches having different architectures and different operating details may also be used.

CPU 602 performs overall configuration and control of the switch 600 operation. CPU 602 operates in cooperation with switch control 604, an application specific integrated circuit (ASIC) designed to assist CPU 602 in performing packet switching at high speeds required by modern networks. Switch control 604 controls the "forwarding" of received packets to appropriate locations within the switch for further processing and/or for transmission out another switch port. Switch control 604 includes inbound and outbound high speed FIFOs (606 and 608, respectively) for exchanging data over switch bus 652 with port modules. Memory 610 includes a high and low priority inbound queue (612 and 614, respectively) and outbound queue 616. High priority inbound queue 612 is used to hold received switch control packets awaiting processing by CPU 602 while low priority inbound queue 614 holds other packets awaiting processing by CPU 602. Outbound queue 616 holds packets awaiting transmission to switch bus 650 via switch control 604 through its outbound FIFO 608. CPU 602, switch control 604 and memory 610 exchange information over processor bus 652 largely independent of activity on switch bus 650.

The ports of the switch may be embodied as plug-in modules that connect to switch bus 650. Each such module may be, for example, a multi-port module 618 having a plurality of ports in a single module or may be a single port module 636.

A multi-port module provides an aggregate packet switch performance capable of handling a number of slower individual ports.

Each port includes high speed FIFOs for exchanging data over its respective port. Specifically, each port, 620, 628, and 637, preferably includes an inbound FIFO 622, 630, and 638, respectively for receiving packets from the network medium connected to the port. Further, each port 620, 628, and 637, preferably includes a high priority outbound FIFO 624, 632, and 640, respectively, and a low priority outbound FIFO 626, 634, and 642, respectively. The low priority outbound FIFOs are used to queue data associated with transmission of normal packets while the high priority outbound FIFO is used to queue data associated with transmission of control packets. Each module (618 and 636) includes circuits (not specifically shown) to connect its port FIFOs to the switch bus 650.

As packets are received from a port, the packet data is applied to the switch bus 650 in such a manner as to permit monitoring of the packet data by switch control 604. In general, switch control 604 manages access to switch bus 650 by all port modules (i.e., 618 and 636). All port modules "listen" to packets as they are received and applied by a receiving port module to switch bus 650. If the packet is to be forwarded to another port, switch control 604 applies a trailer message to switch bus 650 following the end of the packet to identify which port should accept the received packet for forwarding to its associated network link.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A networking apparatus capable of switching packets and configured to be a member of a group of switches, a plurality of virtual local area network (VLANs) configured within the group of switches, the apparatus comprising:
    a plurality of ports, each port mapped to a different VLAN of the plurality of VLANs, a single network device outside the group of switches being connected to one or more selected ports of the plurality of ports;
    memory; and
    a processor coupled to the memory and to the plurality of ports,
    wherein the processor executes programming stored in the memory to:
        determine a number of the selected ports to which the single network device is connected;
        where the number of the selected ports is not less than a number of the VLANs configured within the group of switches, communicating data packets between a selected VLAN of the plurality of VLANs and the single network device over one of the selected ports that corresponds to the selected VLAN;
        where the number of the selected ports is less than the number of the VLANs configured within the group of switches, such that the VLANs comprise one or more connected VLANs that are connected to the selected ports and one or more unconnected VLANs that are not connected to the selected ports,
            collapsing each unconnected VLAN onto one of the connected VLANs;
            communicating data packets between a selected unconnected VLAN of the unconnected VLANs and the single network device over one of the selected ports that corresponds to the connected VLAN onto which the selected unconnected VLAN has been collapsed.

2. The networking apparatus of claim 1, wherein the group of switches comprises a mesh of switches.

3. The networking apparatus of claim 2, wherein the plurality of ports includes non-mesh ports connected to network devices outside of the mesh of switches.

4. The networking apparatus of claim 1, wherein the one or more selected ports to which the single network device is connected comprise a single selected port.

5. The networking apparatus of claim 1, wherein the one or more selected ports to which the single network device is connected comprises a plurality of selected ports.

6. The networking apparatus of claim 1, wherein the single network device is connected to only the networking apparatus of the group of switches and not to any other networking apparatus of the group of switches.

7. A method comprising:
    connecting a single network device outside of a group of switches to one or more ports of one or more selected switches of the group of switches;
    mapping each port to a different virtual local area network (VLAN) of a plurality of VLANs configured within the group of switches;
    determining a number of the ports to which the single network device is connected;
    where the number of the ports is not less than a number of the VLANs configured within the group of switches, communicating data packets between a selected VLAN of the plurality of VLANs and the single network device over one of the ports that corresponds to the selected VLAN;
    where the number of the ports is less than the number of the VLANs configured within the group of switches, such that the VLANs comprise one or more connected VLANs that are connected to the ports and one or more unconnected VLANs that are not connected to the ports,
        collapsing each unconnected VLAN onto one of the connected VLANs;
        communicating data packets between a selected unconnected VLAN of the unconnected VLANs and the single network device over one of the ports that corresponds to the connected VLAN onto which the selected unconnected VLAN has been collapsed.

8. The method of claim 7, wherein the group of switches comprises a mesh of switches.

9. The method of claim 7, wherein the one or more ports to which the single network device is connected comprise a single selected port.

10. The method of claim 7, wherein the one or more selected ports to which the single network device is connected comprises a plurality of selected ports.

11. The method of claim 7, wherein the single networking device is connected to only one switch of the group of switches and not to any other switch of the group of switches.

12. A system comprising:
    a group of switches within which a plurality of virtual local area networks (VLANs) are configured,
    wherein a selected switch of the group of switches comprises:
        a plurality of ports, each port mapped to a different VLAN of the plurality of VLANs, a single network device outside the group of switches being connected to one or more selected ports of the plurality of ports;
        memory; and
        a processor coupled to the memory and to the plurality of ports,
        wherein the processor executes programming stored in the memory to:
            determine a number of the selected ports to which the single network device is connected;
            where the number of the selected ports is not less than a number of the VLANs configured within the group of switches, communicating data packets between a selected VLAN of the plurality of VLANs and the single network device over one of the selected ports that corresponds to the selected VLAN;
            where the number of the selected ports is less than the number of the VLANs configured within the group of switches, such that the VLANs comprise one or more connected VLANs that are connected to the selected ports and one or more unconnected VLANs that are not connected to the selected ports,
            collapsing each unconnected VLAN onto one of the connected VLANs;
            communicating data packets between a selected unconnected VLAN of the unconnected VLANs and the single network device over one of the selected ports that corresponds to the connected VLAN onto which the selected unconnected VLAN has been collapsed.

13. The system of claim 12, wherein the group of switches comprises a mesh of switches.

14. The system of claim 13, wherein the plurality of ports includes non-mesh ports connected to network devices outside of the mesh of switches.

15. The system of claim 12, wherein the one or more selected ports to which the single network device is connected comprise a single selected port.

16. The system of claim 12, wherein the one or more selected ports to which the single network device is connected comprises a plurality of selected ports.

17. The system of claim 12, wherein the single network device is connected to only the selected switch of the group of switches and not to any other switch of the group of switches.

* * * * *